United States Patent
Liu et al.

(10) Patent No.: US 9,465,579 B2
(45) Date of Patent: Oct. 11, 2016

(54) VARIABLE-LATENCY SPECULATING PIPELINED BOOTH MULTIPLIER WITH STATISTICAL CARRY ESTIMATION FOR ERROR DETECTION AND RECOVERY

(71) Applicant: National Chiao Tung University, Hsinchu (TW)

(72) Inventors: Chih-Wei Liu, Hsinchu (TW); Shin-Kai Chen, Hsinchu (TW); Kuo-Chiang Chang, Hsinchu (TW); Tsung-Yi Wu, Hsinchu (TW); An-Chi Tsai, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 297 days.

(21) Appl. No.: 14/204,133

(22) Filed: Mar. 11, 2014

(65) Prior Publication Data

US 2015/0261500 A1    Sep. 17, 2015

(51) Int. Cl.
*G06F 7/52*    (2006.01)
*G06F 7/533*    (2006.01)

(52) U.S. Cl.
CPC .................. *G06F 7/533* (2013.01)

(58) Field of Classification Search
CPC ........................................... G06F 7/405
USPC .................................. 708/625–631
See application file for complete search history.

(56) References Cited

PUBLICATIONS

Wu et al., "Study on Variable-Latency Speculating Booth Multiplier for Multimedia Applications", National Chiao Tung University, Mar. 2013.

*Primary Examiner* — Tan V. Mai
(74) *Attorney, Agent, or Firm* — Mintz Levin Cohn Ferris Glovsky and Popeo, P.C.; Peter F. Corless; Steven M. Jensen

(57) ABSTRACT

Provided is a method for processing pipelined data using a variable-latency speculating booth multiplier (VLSBM), including a first operation and a second operation. The first operation has the steps of partitioning partial products into a least significant part (LSP) and a most significant part (MSP), estimating a carry of the LSP, computing the MSP based on the estimated carry, computing the LSP independently to obtain a true carry and detecting a computation error by comparing the estimated carry with the true carry. Also, the second operation has the step of correcting the computation error based on the difference between the estimated carry and the true carry. Further, a VLSBM for processing pipelined data is also provided.

14 Claims, 4 Drawing Sheets

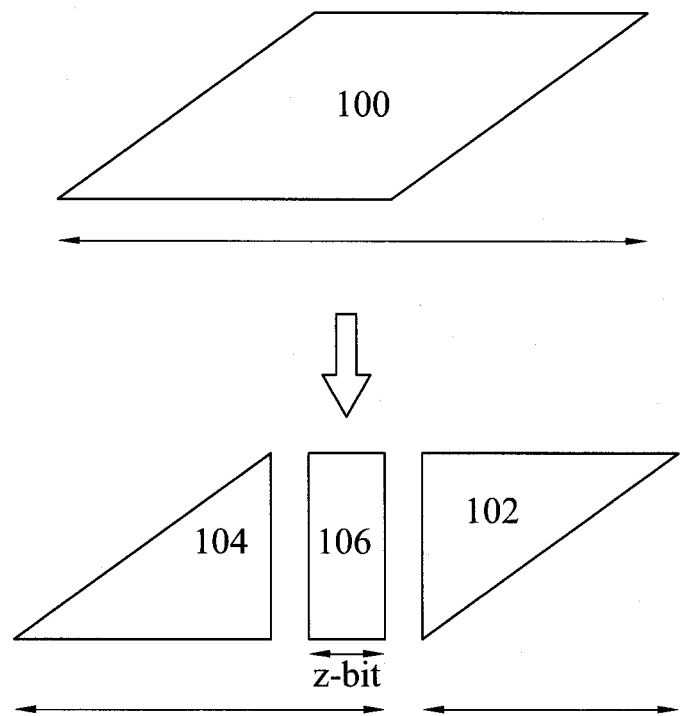
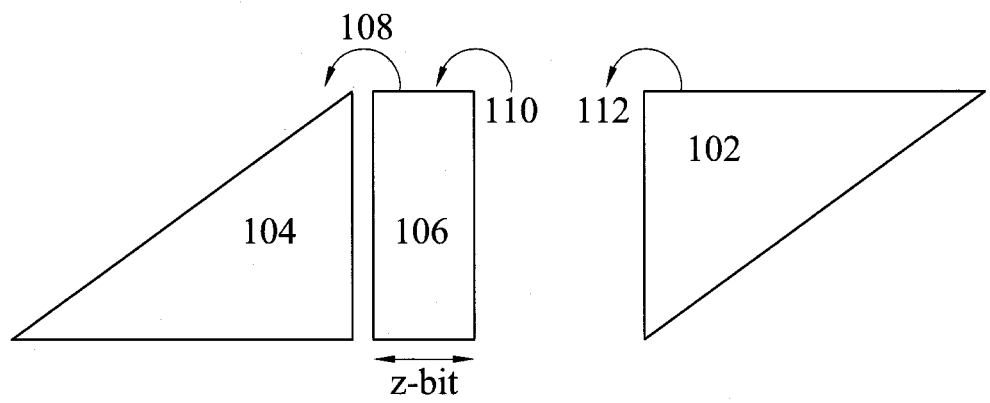
FIG. 1a
FIG. 1b

VARIABLE-LATENCY SPECULATING PIPELINED BOOTH MULTIPLIER WITH STATISTICAL CARRY ESTIMATION FOR ERROR DETECTION AND RECOVERY

BACKGROUND OF THE INVENTION

1. Field of the Invention

The present invention relates to a method and a computing device for pipelined data, and, more particularly, to a variable-latency speculating pipelined booth multiplier (VLSBM) with a statistical carry estimation for error detection and recovery.

2. Description of Related Art

Nowadays, multiplication is critical in the multimedia standards since the multiplication operation requires a large amount of computation in multimedia applications such as JPEG compression, human face detection and H.264/AVC decoder. With the necessary multiplication requirement for the multimedia applications, the better performance of a multiplier is required to satisfy today's multimedia standards.

Pipelining is an approach to alleviate the drawback from aggressive logic-level and gate-level timing optimizations. As such, the pipeline method is one of the most common and effective techniques used in the design of a multiplier to improve the overall performance of a multiplier. However, data hazards cause severe performance degradation in the pipeline method due additional stall cycles.

In structured VLSI design, a significant volume of logic-level and gate-level optimizations is used to minimize the critical path. The circuit restructuring method is used to reduce the logic depth, thereby decreasing the circuit delay. Moreover, the gate-sizing approach replaces the critical path cells with those having high driving strength. Although the above approaches may reduce the critical path, these approaches require an additional or larger silicon area such that power dissipation is increased due to the large silicon area.

Further, conventional worst-case design suffers from process-voltage-temperature (PVT) variations, leakage, soft errors and noise in micro-process or nano-process technologies.

Accordingly, for the above problems, it is necessary to provide a method for processing pipelined data in a fast and efficient manner.

The above-described deficiencies of today's multiplier are merely intended to provide an overview of some of the problems of the conventional methods, and are not intended to be exhaustive. Other problems with conventional methods and corresponding benefits of the various non-limiting embodiments described herein may become further apparent upon review of the following description.

SUMMARY OF THE INVENTION

According to the above drawbacks, the present invention provides a method and a variable-latency speculating booth multiplier (VLSBM) for processing pipelined data, thereby effectively increasing the computing speed and reducing the computing time. Moreover, the present invention also can improve the pipeline performance without increasing the integrated circuit layout area.

In accordance with the above and other objectives, the present invention provides a method for processing pipelined data using the VLSBM, comprising a first operation including the steps of: partitioning partial products into a least significant part (LSP) and a most significant part (MSP), estimating a carry of the LSP, computing the MSP based on the estimated carry, computing the LSP independently to obtain a true carry, and detecting a computation error by comparing the estimated carry with the true carry; and a second operation including the step of correcting the computation error based on the difference between the estimated carry and the true carry.

According to the present invention, the step of detecting a computation error further comprises the steps of determining a sign signal according to the detected computation error and calculating a carry signal based on the partial products of the most significant z bits of the LSP and the difference between the estimated carry with the true carry.

The present invention further provides a VLSBM for processing pipelined data, comprising a partial product generator configured for partitioning partial products into a least significant part (LSP) and a most significant part (MSP); a carry estimation function module configured for estimating a carry of the LSP; a carry-propagation adder configured for computing the MSP based on the estimated carry and computing the LSP independently to obtain a true carry; a subtractor configured for detecting a computation error by comparing the estimated carry with the true carry; and an adder configured for correcting the computation error based on the difference between the estimated carry and the true carry.

Moreover, the subtractor is further configured for determining a sign signal according to the detected computation error, and calculating a carry signal based on the partial products of the most significant z bits of the LSP and the difference between the estimated carry with the true carry. As such, the computation error is corrected based on the sign signal and the carry signal.

In the present invention, more preferably, each of the LSP and the MSP has n bits, where n is an integer, and a carry of the LSP is estimated based on an observation of most significant z bits of the LSP, where z is an integer. Optionally, the most significant z bits of LSP are greater than or equal to 1 bit and less than n bits.

BRIEF DESCRIPTION OF DRAWINGS

The present invention can be more fully understood by reading the following detailed description of the preferred embodiments, with reference made to the accompanying drawings, wherein:

FIG. 1a is a schematic diagram illustrating a method for computing partial products using a variable-latency speculating booth multiplier (VLSBM) according to the present invention;

FIG. 1b is a schematic diagram illustrating a carry estimation scheme using the VLSBM according to the method of the present invention, as shown in FIG. 1A;

DETAILED DESCRIPTION OF THE INVENTION

Figure 2:
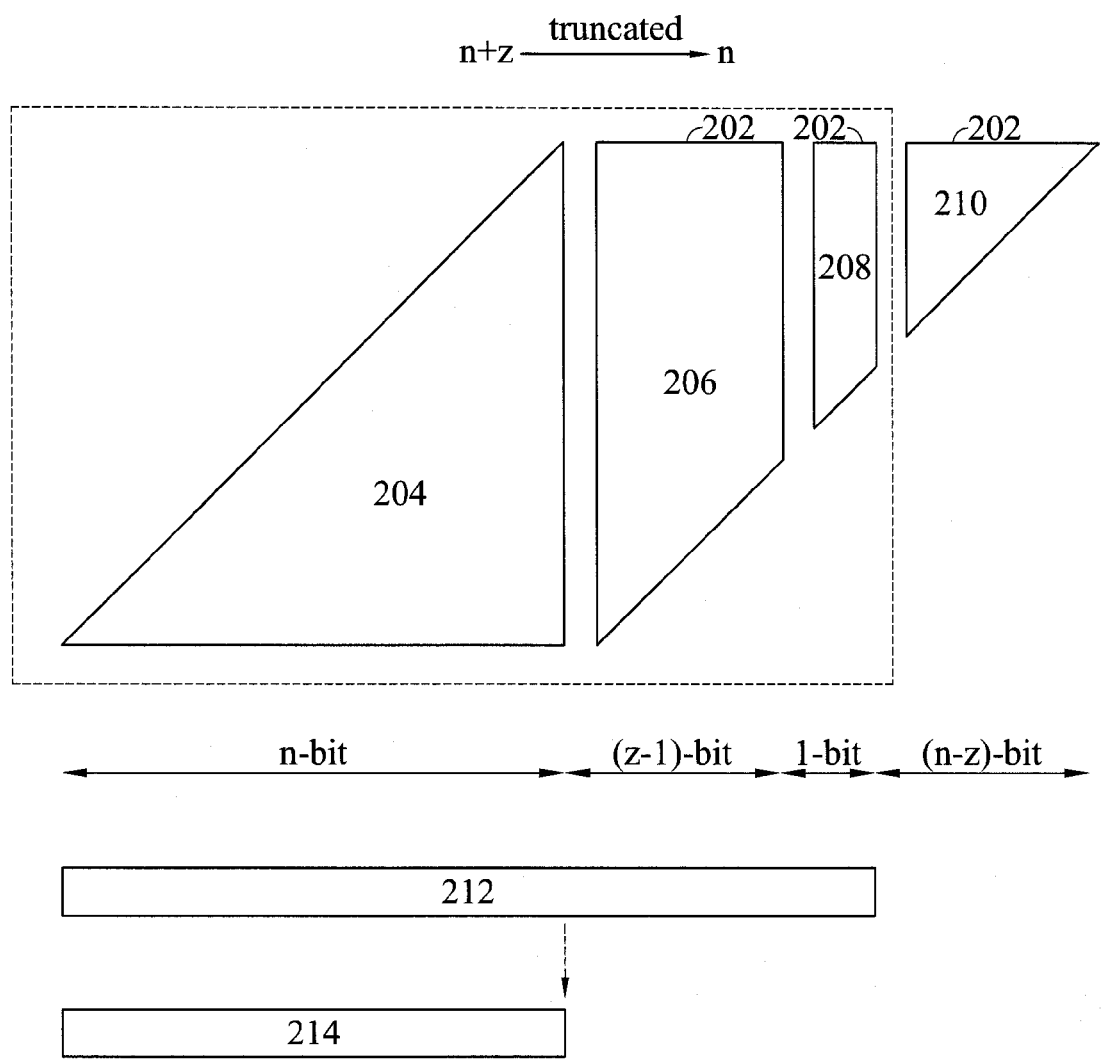
FIG. 2 is a schematic diagram depicting the method for computing partial products using the VLSBM according to one embodiment of the present invention.

The following illustrative embodiments are described in sufficient detail to illustrate the disclosure of the present invention. It should be understood that other embodiments would be evident based on the present invention, and that system or mechanical changes may be made without departing from the scope of the present invention.

In the following description, numerous specific details are given to provide a thorough understanding of the present invention. However, it will be apparent that the present invention may be practiced without these specific details. In order to avoid obscuring the present invention, some well-known mechanisms and system configurations are not disclosed in detail.

The drawings showing embodiments of the method are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

The present invention provides a method for processing pipelined data using a variable-latency speculating booth multiplier (VLSBM) with a statistical carry estimation, comprising a first operation and a second operation. The first operation represents a speculating stage, and the second operation represents a correcting stage.

As shown in FIG. 1a, the method of the present invention comprises a result of multiplying; that is, a plurality of partial products 100. The plurality of partial products 100 of the VLSBM may be partitioned into two parts; that is, a most significant part (MSP) 102 and a least significant part (LSP) 104. Each of the MSP and the LSP has n bits, where n is an integer. The most significant z bits of the LSP represents a z-bit column.

In one embodiment of the present invention, according to observing a z-bit column 106 of the partial product 100 (where z is an integer) and speculating a carry 110 of the LSP 104, an estimated carry 108 may be obtained by adding the result of the z-bit column 106 and the carry 110. As such, without waiting for a true carry 112 propagation, the method of the present invention predicts the true carry 112. Therefore, the results of the LSP 102 and MSP 104 are performed independently and in parallel. The true carry 112 is obtained by independently computing the LSP 102, as shown in FIG. 1b. By comparing the estimated carry 108 with the true carry 112, a computation error may be detected and compensated in next stage (i.e., the correcting stage).

According to the present invention, the VLSBM may be an n-bit fixed-width z-PT (post-truncation) multiplier, as illustrated in FIG. 2. Each of the LSP 202 and the MSP 204 has n bits, where n is an integer, and preferably, $1 \leq z \leq n$. The LSP 202 comprises a (z−1)-bit most significant column 206, a 1-bit most significant column 208 and a remaining (n−z)-bit column 210. Therefore, a carry of the LSP can be estimated by summing a (n+z)-bit most significant columns 212, i.e., the summation of the MSP 204, the (z−1)-bit most significant column 206 and the 1-bit most significant column 208. Subsequently, the carry of the LSP may be rounded or truncated to a n-bit result 214.

In one example of the present invention, in order to reduce hardware requirements, the carry of the LSP may be estimated by observing only one column of the plurality of partial products, i.e., z=1. According to one example of the present invention, the 1-bit most significant column 208 is applied to recovery a truncation error and obtain a fast and accurate fixed-width multiplier.

Figure 3:
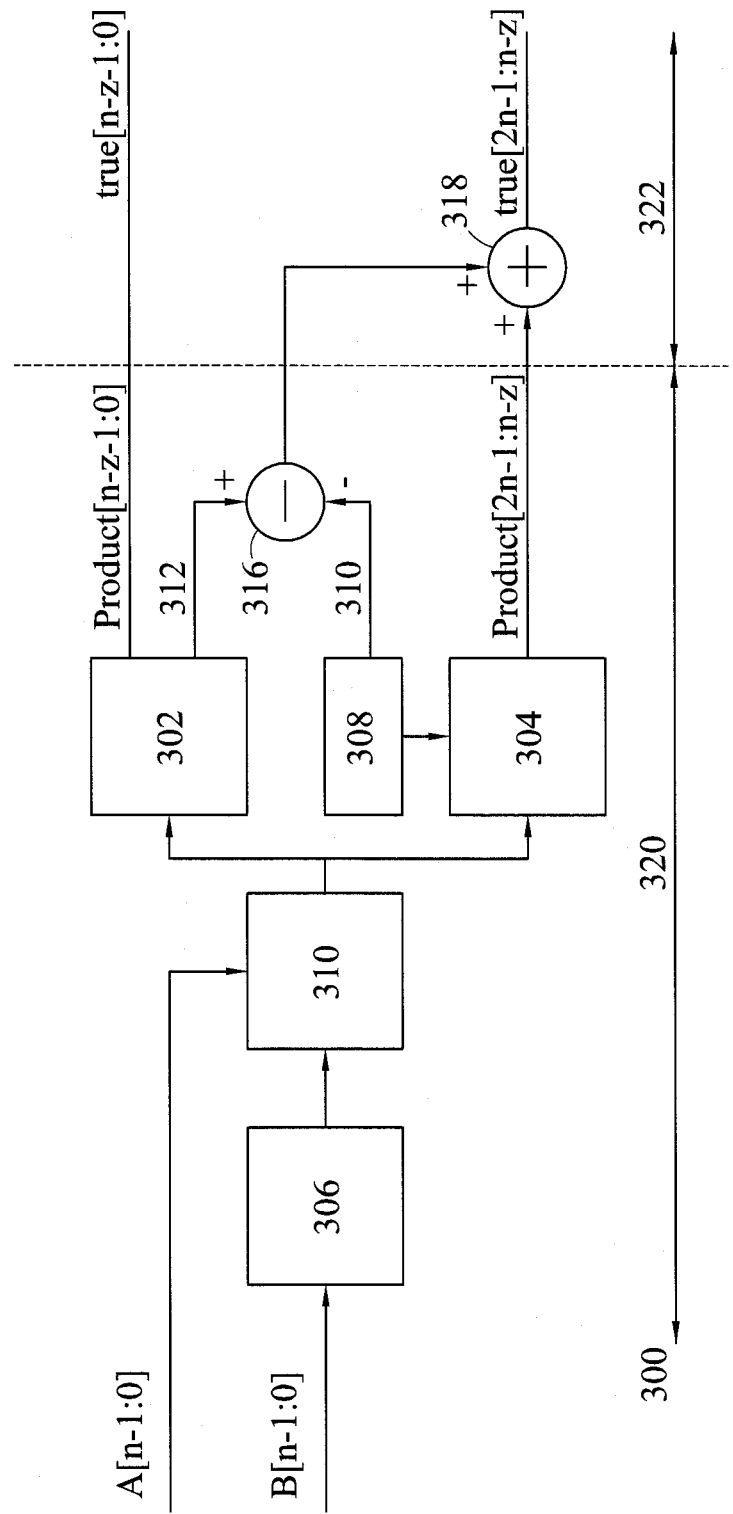
FIG. 3 is a block diagram illustrating the VLSBM for computing partial products according to one embodiment of the present invention.

Referring to FIG. 3, FIG. 3 is a block diagram illustrating a VLSBM 300 according to one embodiment of the present invention. The VLSBM 300 comprises a first operating stage 320 and a second operating stage 322. The first operating stage 320 performs the speculating stage. The second operating stage 322 performs the correcting stage. As shown in FIG. 3, the first operating stage 320 includes the steps of partitioning the plurality of partial products generated by a partial product generator 310 with an input A and an encoded result B generated by a booth encoder 306 (the input A and the encoded result B are symmetric, independent and identically distributed random variables) into a LSP 302 and a MSP 304; estimating a carry 310 of the LSP 302 by a carry estimation function 308; computing the MSP 304 based on the estimated carry 310; computing the LSP 302 independently to obtain a true carry 312; and detecting a computation error by comparing the estimated carry 310 with the true carry 312 by using a subtractor 316. The second operating stage 322 includes the step of correcting the computation error based on the difference between the estimated carry 310 and the true carry 312 by using an adder 318.

In addition, when detecting the computation error 312, a sign signal and a carry signal are determined by the subtractor 316. Therefore, the estimated carry 310 is subtracted from the true carry 312. More specifically, the sign signal is the sign of the calculation result, and the carry signal is obtained by adding up the calculation result and the products of the z-bit most significant columns of the LSP 302. The sign signal and the carry signal are used to determine whether the estimated carry 310 is correct. Accordingly, the following four conditions are based on the value of the sign signal:

1. If sign=0 and carry=0, no remainder is required for further compensation of product [2n−1:n−z] during the second operating stage.

2. If sign=0 and carry=1, a non-zero carry must be added to product [2n−1:n−z] during the second operating stage.

3. If sign=1 and carry=0, no remainder requires compensation for product [2n−1:n−z] during the second operating stage, except for sign-extended bits.

4. If sign=1 and carry=1, a non-zero carry must be added to product [2n−1:n−z] during the correcting phase, except for sign-extended bits. Since adding up the all-ones vector and the non-zero carry-bit results in the all-zero vector, no remainder is required for further compensation of product [2n−1:n] during the second operating stage.

Figure 4:
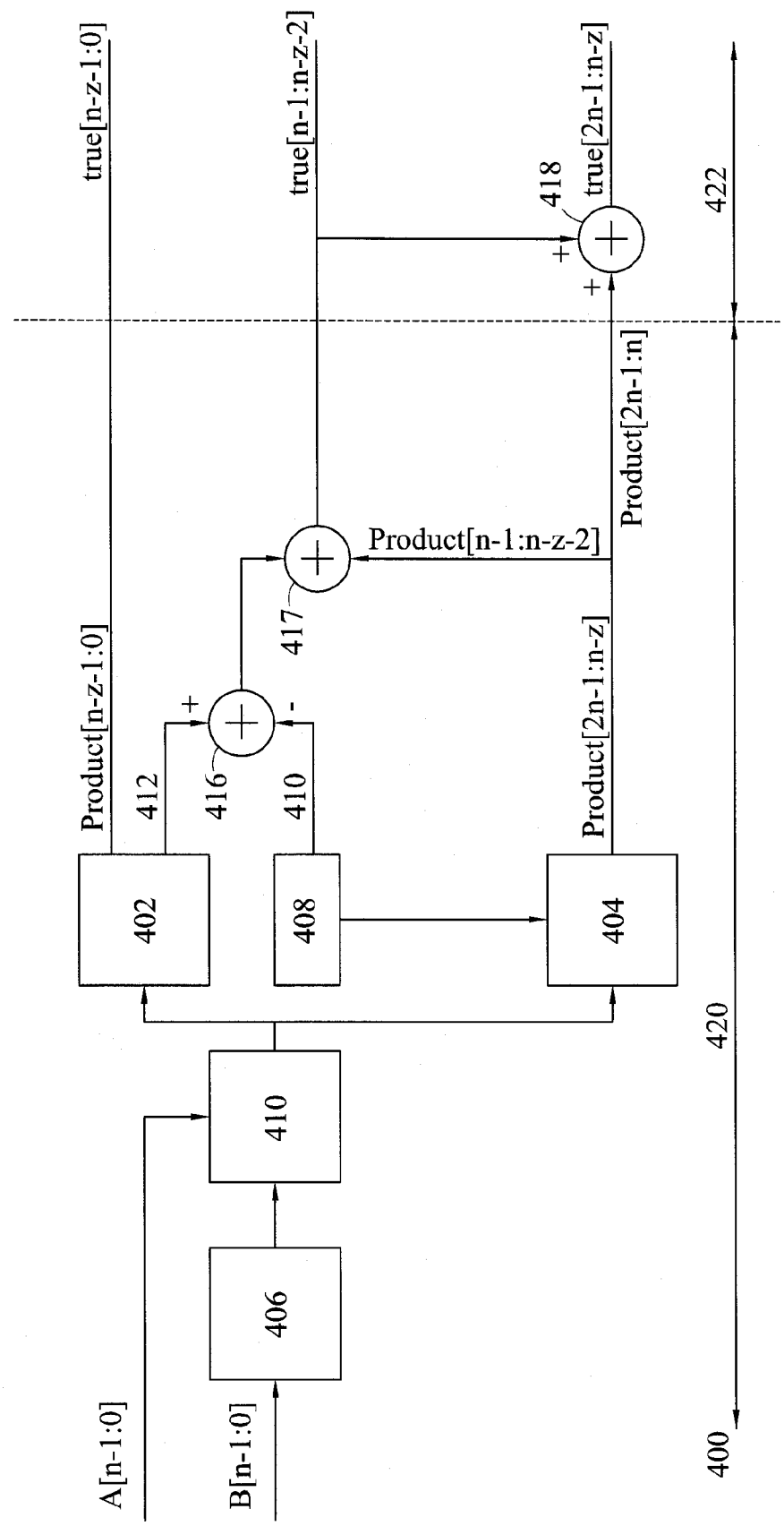
FIG. 4 is a block diagram illustrating the VLSBM for computing partial products according to another embodiment of the present invention.

Referring to FIG. 4, FIG. 4 is a block diagram illustrating a VLSBM 400 according to another embodiment of the present invention. The VLSBM 400 comprises a first operating stage 420 and a second operating stage 422. The first operating stage 420 performs the speculating stage. The second operating stage performs the correcting stage. As shown in FIG. 4, The first operating stage 420 includes the steps of partitioning the plurality partial products generated by a partial product generator 410 with an input A and an encoded result B generated by a booth encoder 406 (the input A and the encoded result B are symmetric, independent and identically distributed random variables) into a LSP 402 and a MSP 404; estimating a carry 410 of the LSP 402 by a carry estimation function 408, computing the MSP 404 based on the estimated carry 410; computing the LSP 402 independently to obtain a true carry 412; detecting a computation error by comparing the estimated carry 410 with the true carry 412 by using a subtractor 416; and correcting the computation error of product [n−1:n−z−2] based on the difference between the estimated carry 410 and the true carry 412 by using an adder 417. The advantage of correcting a portion of the MSP 404 in the first operating stage is that as long as the correction of product [n−1:n−z−2] does not generate a carry, the correction still can be completed in one clock cycle, such that the error rate may be reduced. The second operating stage includes to the step of correcting the computation error of product [2n−1:n] based on the difference between the estimated carry 410 and the true carry 412 by using an adder 418.

Further, when detecting the computation error 412, a sign signal and a carry signal are determined by the subtractor 416. As such, the estimated carry 410 is subtracted from the true carry 412. More specifically, the sign signal is the sign of the calculation result, and the carry signal is obtained by adding up the calculation result and the products of the z-bit most significant columns of the LSP 402. The sign signal and the carry signal are used to determine whether the estimated carry 410 is correct.

Accordingly, the following four conditions are based on the value of the sign signal:

1. If sign=0 and carry=0, no remainder is required for further compensation of product [2n−1:n] during the second operating stage.

2. If sign=0 and carry=1, a non-zero carry must be added to product [2n−1:n] during the second operating stage.

3. If sign=1 and carry=0, no remainder requires compensation for product [2n−1:n] during the second operating stage, except for sign-extended bits.

4. If sign=1 and carry=1, a non-zero carry must be added to product [2n−1:n] during the correcting phase, except for sign-extended bits. Since adding up the all-ones vector and the non-zero carry-bit results in the all-zero vector, no remainder is required for further compensation of product [2n−1:n] during the second operating stage.

The resulting VLSBM of the present invention is cost-effective, uncomplicated, highly versatile and effective, and can be implemented by adopting known semiconductor technology for efficient and economical manufacturing, application and utilization.

Another important aspect of the present invention is that it valuably supports and services the trend of reducing costs and the layout area, simplifying systems and increasing performance.

While the invention has been described in conjunction with a specific best mode, it should be understood that many alternatives, modifications, and variations will be apparent to those skilled in the art in light of the aforesaid description. Accordingly, it is intended to embrace all such alternatives, modifications, and variations that fall within the scope of the included claims. All matters heretofore set forth herein or shown in the accompanying drawings are to be interpreted in an illustrative and non-limiting sense.

What is claimed is:

1. A method for processing pipelined data using a variable-latency speculating booth multiplier (VLSBM) with a statistical carry estimation, comprising:
 a first operation, including the steps of:
  partitioning a plurality of partial products, by a partial product generator, into a least significant part (LSP) and a most significant part (MSP);
  estimating a carry of the LSP by a carry estimation function module;
  computing the MSP, by a carry-propagation adder, based on the estimated carry;
  computing the LSP, by the carry-propagation adder, independently to obtain a true carry; and
  detecting a computation error, by a subtractor, by comparing the estimated carry with the true carry; and
 a second operation, including the step of:
  correcting the computation error, by an adder, based on a difference between the estimated carry and the true carry.

2. The method of claim 1, wherein each of the LSP and the MSP has n bits, where n is an integer.

3. The method of claim 1, wherein the step of estimating a carry of the LSP is performed based on an observation of most significant z bits of the LSP, where z is an integer.

4. The method of claim 3, wherein the most significant z bits of LSP are greater than or equal to 1 bit and less than n bits.

5. The method of claim 1, wherein the step of detecting a computation error further comprises:
 determining a sign signal according to the detected computation error; and
 calculating a carry signal based on the plurality of partial products of the most significant z bits of the LSP and the difference between the estimated carry with the true carry.

6. The method of claim 5, wherein the step of correcting the computation error is performed based on the sign signal and the carry signal.

7. The method of claim 1, wherein the first operation is performed in a first stage, and the second operation is performed in a second stage.

8. The method of claim 7, wherein a portion of the second operation is performed in the first stage.

9. A variable-latency speculating booth multiplier (VLSBM) with a statistical carry estimation for processing pipelined data, comprising:
 a partial product generator configured for partitioning a plurality of partial products into a least significant part (LSP) and a most significant part (MSP);
 a carry estimation function module configured for estimating a carry of the LSP;
 a carry-propagation adder configured for computing the MSP based on the estimated carry and computing the LSP independently to obtain a true carry;
 a subtractor configured for detecting a computation error by comparing the estimated carry with the true carry; and
 an adder configured for correcting the computation error based on a difference between the estimated carry and the true carry.

10. The multiplier of claim 9, wherein each of the LSP and MSP has n bits, where n is an integer.

11. The multiplier of claim 9, wherein the carry estimation function module estimates the carry of the LSP based on an observation of most significant z bits of the LSP, where z is an integer.

12. The multiplier of claim 11, wherein the most significant z bits of LSP are greater than or equal to 1 bit and less than n bits.

13. The multiplier of claim 9, wherein the subtractor is further configured for determining a sign signal according to the detected computation error, and calculating a carry signal based on the plurality of partial products of the most significant z bits of the LSP and the difference between the estimated carry with the true carry.

14. The multiplier of claim 13, wherein the adder corrects the computation error is performed based on the sign signal and the carry signal.

* * * * *